Feb. 18, 1936.  C. A. STEVENS  2,031,577
WIRE CLIP AND HANDLE
Filed July 19, 1935
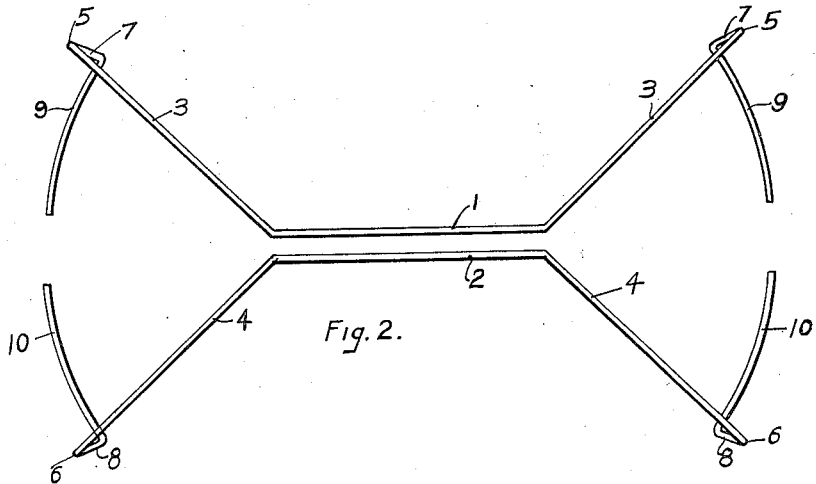
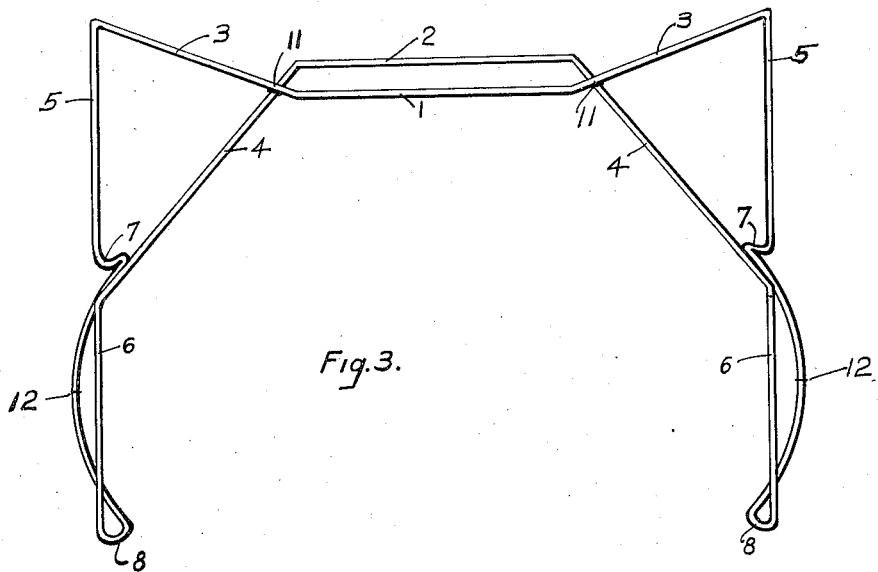
INVENTOR.
Carl A. Stevens.
BY Louis J. McBane.
ATTORNEY.

Patented Feb. 18, 1936

2,031,577

UNITED STATES PATENT OFFICE 2,031,577

WIRE CLIP AND HANDLE

Carl A. Stevens, Carrollton, Ohio, assignor to The Carrollton Metal Products Company, a corporation of Ohio Application July 19, 1935, Serial No. 32,218

4 Claims. (Cl. 220—1)

This invention relates to a handle and wire clip useful in connection with food containers, such as disclosed in the patent to Pfefferkorn and Stevens, No. 2,009,516.

It is an object of this invention to provide a clip for detachable association with food containers, to hold the containers in assembled relation, and to a method of making the same. It is an object of this invention to provide a one-piece wire clip, for food containers, and a method of making the same. It is an object of this invention to provide a one-piece wire clip characterized by simplicity, ruggedness, and inexpensiveness of construction. It is an object of this invention to provide a method of making a one-piece wire clip which is simple, inexpensive and amenable to machine methods of manufacture.

Other objects and advantages of this invention will appear in the following detailed description taken in connection with the accompanying drawing, in which Figure 1 is a side view of the wire pieces which are the initial materials for making the clip of this invention.

Figure 2 is a view, in top plan, illustrating the wire pieces after the bending operations have been completed.

Figure 3 is a view, in perspective, illustrating a wire clip embodying this invention.

The manner in which the clip is made will be described first, the functions and mode of operation of the clip to follow.

In making the clip, two straight pieces of wire 1 and 2, Figure 2, are cut to length. This is the only operation of this nature involved. Next, each wire 1 and 2, undergoes a bending operation. The bending operation may be effected as a sequence of steps made individually in suitable machines or by hand. Or, the bending operations all may be performed in one machine as one operation.

The wires 1 and 2 are bent to form portions 3 and 4, extending from both ends of the central straight portions of the wires. The wires are further bent to provide portions 5 and 6 which extend in a direction nearly perpendicular to the plane of portion 3 and portion 4 respectively. The wires are further bent to provide portions 7 and 8, on wires 1 and 2 respectively, which portions extend laterally from the portions 5 and 6 respectively, in a direction generally toward the middle part of the wires 1 and 2, respectively. The wires are further bent to form arcuate portions 9 and 10, on wires 1 and 2, respectively, which extend laterally both from portions 7 and 8, and from 5 and 5, respectively, of wires 1 and 2. The resulting forms are mating halves of the clip.

The third step is to assemble the mating halves. This is effected by bringing the central portions of the wires 1 and 2 adjacent, one to the other, with the portions 3 and 4 crossing, as indicated at 11, and with the ends of the arcuate portions 9 and 10 in abutment, as indicated at 12, Figure 3. With the parts so associated, they are secured together, it being suitable to solder or weld the wires together where they cross at 11 and where they abut at 12, thus making a one-piece wire clip. Other fastening means may be used for securing the mating halves together, within the purview of this invention.

Thus the clip of this invention is made by a series of simple steps involving four kinds of simple operations, namely, cutting the wires to length, bending them to shape, assembling them in proper relation, and joining them together in any suitable manner. Obviously the manufacture of the clip is inexpensive.

The clip of this invention is intended for use with containers, primarily food containers. It is especially intended for use with food containers, having two or more separate parts. Many food containers are in common use which have a base means and a covering means which together afford an interior space for food. The base means may be a tray or a pan, and the covering means may be a lid, shallow or deep, or it may consist of a stack of nested trays or pans. Devices of these types are illustrated in the patents to Pfefferkorn, No. 1,762,417 and to Pfefferkorn and Stevens, No. 2,009,516.

Food containers of those types have certain common characteristics. In order that the covering means may have suitable support on the base means, the parts are so constructed that the base means has a margin or flange which extends beyond the bottom edge of the covering means, when the latter rests on the base means. Also, such devices commonly have some means such as a circular channel, a central raised area, or the like, into or over which the bottom edge of the covering means fits, and which operate to hinder lateral displacement of the covering means relative to the base means. Such food containers are rendered much more useful when combined with the clip of this invention, in a manner such as illustrated in the Pfefferkorn and Stevens patent, supra.

The clip of this invention operates to secure the covering means and the base means together and to afford a handle for carrying the ensemble. To secure the parts of such food containers together, it is essential to press the parts together in a direction substantially in line with or substantially parallel to a central vertical line through the assembled container. The clip of this invention, affords inturned portions, 7 and 8, 9 and 10, adapted to engage the underside of such a margin or flange of a food container, with the intermediate portions, 1 and 2, 3 and 4, 5 and 6 extending over and engaging the covering means. The wire portions 7 and 8 extend inwardly and upwardly from the lower ends of wire portions 5 and 6, as shown in Figure 3. This structure insures that the innermost part of the inturned portions, only, engage the underside of the flange of a food container. This reduces the chance for the inturned portions to slip off a flange to a minimum; and the flange may have a recess to receive the engaging part of the inturned portions, still further enhancing the security of the grip.

The clip is in sprung condition when assembled with the food container, the inturned portions pressing up on the underside of the margins or flange of the base means of a food container, and the intermediate portion pressing down on the covering means. Engagement of the clip with the covering means takes place centrally of the clip, at wire portions 1 and 2, Figure 3. The force on the central part of the clip, either due to engagement with the container or due to lifting the container, using the central part of the clip as a handle, tends to bow the clip so as to cause the inturned portions to press inwardly to engage the flange or margin of the base means of the container with increasing force as the upward force on the central part of the clip increases. This action of the clip insures that the greater the strain placed on the clip in the normal use thereof, the more securely will the clip hold the container.

Usually the covering means of the food container has a knob with which the intermediate portion of the clip engages and there is sufficient clearance beneath the central part of the clip, around the knob, so that the central part of the clip affords a convenient grip for carrying the ensemble.

While the arcuate portions, forming joining means for the inturned portions, are desirable in that they provide strength and rigidity to the clip, they may be dispensed with, if desired, leaving portions 7 and 8 as the inturned portions.

The invention has been described in detail, by way of illustration, but it is not intended so to limit the invention, since modifications in the details thereof may be made, as will be apparent to one skilled in the art, without departing from the spirit and scope of the invention as defined in the following claims.

What I claim as my invention is as follows:

1. A one-piece wire clip consisting of a central part of spaced wire portions, wire portions diverging from the ends of the central wire portions, leg portions extending in a direction substantially perpendicular to the plane of the central part, inturned portions extending toward the center of the clip from the leg portions and including arcuate portions joining adjacent inturned portions said inturned portions being inclined from the leg portions toward the central part of the clip.

2. A one-piece wire clip consisting of an intermediate portion comprising a central part and leg parts extending from the outer ends of the central part in a direction substantially perpendicular to the central part, and of inturned portions joined by the intermediate portion, said inturned portions including wire portions extending laterally from the extremities of the leg parts in directions toward the central part of the clip and extending upwardly above the extremities of the leg parts.

3. A one-piece wire clip consisting of an intermediate portion comprising a central part and leg parts extending from the outer ends of the central part in a direction substantially perpendicular to the central part, and of inturned portions joined by the intermediate portion, said inturned portions comprising wire portions extending laterally from the extremities of the leg parts in directions toward the central part of the clip and extending upwardly above the extremities of the leg parts, and arcuate portions joining the last-mentioned wire portions of adjacent leg parts.

4. The method of making a wire clip which comprises bending wire to form mating halves, each half having a central part, leg parts extending from the central part, inturned parts extending from the leg parts, and arcuate parts extending from the inturned parts, assembling the mating halves with the central parts overlapping and crossing and with the ends of the arcuate parts abutting, joining the halves where they cross and where the ends of the arcuate parts abut.

CARL A. STEVENS.